(12) United States Patent
Tachibana et al.

(10) Patent No.: US 6,169,161 B1
(45) Date of Patent: Jan. 2, 2001

(54) METHOD FOR PRODUCING POLYAMIDES

(75) Inventors: Yasuto Tachibana, Handa; Shigeru Okita, Nagoya; Koji Onishi, Kuwana, all of (JP)

(73) Assignee: Toray Industries, Inc.(JP)

(*) Notice: Under 35 U.S.C. 154(b), the term of this patent shall be extended for 0 days.

(21) Appl. No.: 09/281,625

(22) Filed: Mar. 31, 1999

(30) Foreign Application Priority Data

| Apr. 3, 1998 | (JP) | 10-091795 |
| Apr. 3, 1998 | (JP) | 10-091796 |
| Feb. 18, 1999 | (JP) | 11-039828 |

(51) Int. Cl.$^7$ .............................. C08G 69/14; C08G 69/16
(52) U.S. Cl. .......................... 528/310; 528/313; 528/322; 528/332; 528/335; 528/336; 528/340
(58) Field of Search .................................. 528/310, 313, 528/322, 332, 335, 336, 340

(56) References Cited

U.S. PATENT DOCUMENTS 3,558,567 * 1/1971 Twilley et al. ..................... 528/310
3,741,939 * 6/1973 Wittmer et al. ..................... 528/310

\* cited by examiner

*Primary Examiner*—P. Hampton-Hightower
(74) *Attorney, Agent, or Firm*—Austin R. Miller

(57) ABSTRACT

For producing a polyamide having an unreacted caprolactam content of from 0 to 0.5% by weight and an oligomer content of from 0 to 1.25% by weight and having a relative viscosity in a 0.01 g/ml solution of sulfuric acid at 25° C. of from 2.2 to 8.0, combined is a first step of polymerizing a starting material comprising caprolactam, under atmospheric pressure to prepare a polymerization product having an unreacted caprolactam content of not larger than 25% by weight and an oligomer content falling between 0 and 1.8% by weight, and a second step of heating the polymerization product prepared in the first step, at a temperature T satisfying the following formula (1) and under reduced pressure to thereby remove the unreacted caprolactam and the oligomer from it:

Glass transition point of polyamide<T<melting point of polyamide+150° C.  (1)

11 Claims, No Drawings

METHOD FOR PRODUCING POLYAMIDES

TECHNICAL FIELD

The present invention relates to a method for producing polyamides by polymerizing materials comprising essentially of caprolactam. More precisely, it relates to an efficient method for producing polyamides by polymerizing materials comprising essentially of caprolactam, in which the unreacted caprolactam content and the oligomer content are both reduced to a satisfactorily low level.

BACKGROUND OF THE INVENTION

As having good properties, polyamides produces from materials comprising essentially of caprolactam are used as fibers for clothing and industrial fibers, and are further widely used as injection moldings in various fields of automobiles, electric and electronic appliances and others, and as extruded films and stretched films essentially in the field of food wrapping and packaging.

Polyamides produced from materials comprising essentially of caprolactam are generally produced by heating caprolactam in the presence of a small amount of water. The production process is relatively simple and is widely employed in industrial fields. One typical method of caprolactam polymerization, which is described in "Polyamide Resin Handbook" (edited by Osamu Fukumoto, published by Nikkan Kogyo Shinbun-sha in 1988), pp. 63 to 65, is summarized below.

Caprolactam is melted in a melter, to which is added a polymerization degree regulator such as acetic acid or the like. The starting materials are fed into an atmospheric-pressure polymerization tower heated at about 260° C., and kept there for about 10 hours. The resulting polyamide is taken out from the bottom of the tower in the form of strands into water, and the strands are pelletized. The resulting polyamide (nylon 6) pellets contain a large amount of caprolactam monomer and oligomer resulting from polymerization equilibrium. Therefore, they are transferred into a hot water extraction tower, in which the pellets are countercurrent-wise contacted with hot water fed from the bottom of the tower whereby the monomer and others are extracted and removed from the pellets, and thereafter the pellets are taken out from the bottom of the tower. The extracted pellets contain a large amount of water, and are therefore dried in vacuum or in an inert gas atmosphere at about 100° C.

Thus, the polymerization of caprolactam is extremely simple, but must be indispensably followed by the hot water extraction step and the subsequent drying step for the purpose of removing the unreacted caprolactam and the oligomer from the polymerization product. The costs for the two post-treatment steps are high. Therefore, it is desired to develop a process not requiring the two steps.

Given that situation, there have been proposed a method of removing the unreacted caprolactam and the oligomer from the polymerization product, by processing the molten polyamide at a high temperature in a high vacuum; and a method of reducing the amount of the unreacted caprolactam and the oligomer formed during the polymerization.

For example, in U.S. Pat. No. 3,558,567, there has been proposed a method of processing a molten prepolymer in a flusher or finisher, to thereby remove the unreacted caprolactam and the oligomer from it under reduced pressure.

In U.S. Pat. No. 3,741,939, there has been proposed a high-pressure polymerization method for reducing the amount of the unreacted caprolactam and the oligomer formed during polymerization.

In JP-B 50-26594, there has been proposed a low-temperature polymerization method for reducing the amount of the oligomer.

The production method disclosed in U.S. Pat. No. 3,558,567 comprises polymerizing caprolactam with a water content of from 0.2 to 1.5%, at a temperature between 225 and 280° C. for about 1 hour to a conversion of lower than 45%, followed by heating it at a temperature between 250 and 300° C. under pressure. This method leads to a reaction product of which the unreacted caprolactam content is equal to its equilibrium concentration and the oligomer content is lower than 2% by weight. In Example 1 in this U.S. Patent, the unreacted lactam content and the oligomer content of the reaction product produced are 12% and 1.9%, respectively, and the reaction product is processed in a flusher at 50 mmHg for 10 minutes, and then further in a single-screw finisher at 280° C. and 5 mmHg for 120 minutes, thereby obtaining a polyamide having an unreacted caprolactam content and an oligomer content of lower than 0.1% and 1.7%, respectively. In Example 2 and Example 3 therein, the same process as in Example 1 is repeated under different conditions to obtain a polyamides having an oligomer content of 1.3%. In the proposed method using such a flusher and a finisher, the extraction step and the drying step that are indispensable in the prior art could be omitted. However, the process itself of the method is still complicated, and, in addition, the oligomer content accomplished by the method is not as yet satisfactory.

The production method disclosed in U.S. Pat. No. 3,741,939 comprises heating caprolactam at a temperature between 120 to 320° C. and at a pressure higher than 2000 atmospheres. However, the lowest content of extractables accomplished by the method is 2.4%. This value is still so high that the extraction step can not be omitted. In addition, the equipment cost and even the equipment maintenance cost for the ultra-high-pressure process of the method are high, and the process itself is dangerous. Therefore, the method can not be practically used.

The method disclosed in JP-B 50-26594 comprises polymerizing caprolactam with a water content of not higher than 0.5% by weight at a temperature between the melting point of the polyamide to be produced and a temperature of "melting point +20° C." to produce a polyamide having a reduced cyclic oligomer content. The lowest cyclic oligomer content accomplished by the method is 0.9% by weight. In this example, however, the unreacted caprolactam content of the polymer is 15.76%, which is high. Therefore, this example faces the problem of low polymer yield. Further, in this example, the polymer produced contains 0.45% by weight of a linear oligomer, in addition to the cyclic oligomer. Consequently, the total oligomer content of the polymer produced is 1.35% by weight. In view of these data, it is in fact difficult to omit the extraction step in this method.

As in the above, an practicable method has heretofore been unknown for producing polyamides from materials comprising essentially of caprolactam, in which high-quality polyamides with a low content of unreacted caprolactam and oligomer can be obtained in high yield without using a hot water extraction step.

SUMMARY OF THE INVENTION

The object of the invention is essentially to provide an efficient method with high producibility for producing polyamides having a low content of unreacted caprolactam and oligomer, which does not require any hot water extraction step for removing the unreacted caprolactam and oligomer, and therefore, the energy cost is low.

Specifically, the invention is to provide a method for producing a polyamide having an unreacted caprolactam content of from 0 to 0.5% by weight and an oligomer content of from 0 to 1.25% by weight and having a relative viscosity of 2.2 to 8.0 in a 0.01 g/ml solution of sulfuric acid at 25° C., which comprises a first step of polymerizing a starting material comprising caprolactam, under atmospheric pressure to prepare a polymerization product having an unreacted caprolactam content of not larger than 25% by weight and an oligomer content between 0 and 1.8% by weight and a second step of heating the polymerization product as prepared in the first step, at a temperature T satisfying the following formula (1) and under reduced pressure to thereby remove the unreacted caprolactam and the oligomer from it:

$$\text{Glass transition point of polyamide} < T < \text{melting point of polyamide} + 150° \text{C}. \quad (1)$$

wherein the glass transition point and melting point of the polyamide are measured by differential scanning calorimetry (DSC) are using a sample prepared by rapidly cooling a molten sample polyamide with the heating rate of 20° C./min. The glass transition point was determined as the inflection point in the specific heat profile of the polyamide, and the melting point was determined as the peak top temperature of the endothermic peak based on the crystal fusion of the polyamide.

It is desirable that, in the first step, the polymerization temperature is not higher than the melting point of the polyamide being produced, for a period of at least 70% of the polymerization time. It is also desirable that the highest polymerization temperature in the first step is not higher than the melting point of the polyamide being produced.

It is still desirable that, in the first step, the salt used is a salt of a dicarboxylic acid/diamine, as the catalyst, in an amount of at most 10 mol % of all the starting compounds. Still desirably, the salt is one derived from an aliphatic and/or aromatic dicarboxylic acid and an aliphatic diamine. Further desirably, the dicarboxylic acid that constitutes the salt is adipic acid, and/or the diamine that constitutes the salt is hexamethylenediamine. More desirably, the salt is the one from adipic acid and hexamethylenediamine.

It is also desirable that the heat treatment in the second step is melt-phase treatment under reduced pressure with stirring at a temperature not lower than the melting point of the polyamide being produced, or solid-phase treatment under reduced pressure with stirring at a temperature lower than the melting point of the polyamide being produced.

DESCRIPTION OF PREFERRED EMBODIMENTS OF THE INVENTION

Embodiments of the invention are described hereunder.

The starting material to be employed in the production method of the invention for producing polyamides through polymerization comprises caprolactam as the essential ingredient, but may contain one or more selected from other lactams, aminocarboxylic acids, and salts of dicarboxylic acids/diamines in an amount not larger than 20 mol. Examples of the additional lactams except caprolactam include valerolactam, enantholactam, capryllactam, undecalactam, laurolactam, etc. Of those, preferred are undecalactam and laurolactam.

Specific examples of the aminocarboxylic acids include 6-aminocaproic acid, 7-aminoheptanoic acid, 8-aminooctanoic acid, 9-aminononanoic acid, 10-aminodecanoic acid, 11-aminoundecanoic acid, 12-aminododecanoic acid, etc. Of those, preferred are 6-aminocaproic acid, 11-aminoundecanoic acid and 12-aminododecanoic acid, and especially preferred is 6-aminocaproic acid.

Specific examples of the dicarboxylic acids for the salts of dicarboxylic acids/diamines include aliphatic dicarboxylic acids such as oxalic acid, malonic acid, succinic acid, glutaric acid, adipic acid, pimelic acid, suberic acid, azelaic acid, sebacic acid, nonanedicarboxylic acid, decanedicarboxylic acid, brassylic acid, dodecanedicarboxylic acid, tridecanedicarboxylic acid, hexadecanedicarboxylic acid; alicyclic dicarboxylic acids such as cyclohexanedicarboxylic acid; aromatic dicarboxylic acids such as phthalic acid, isophthalic acid, terephthalic acid, naphthalene dicarboxylic acid; etc. Preferred are adipic acid, sebacic acid, decandicarboxylic acid, terephthalic acid and isophthalic acid, and especially preferred is adipic acid. Two or more those dicarboxylic acids may be used, as combined.

Specific examples of the diamines for the salts of dicarboxylic acids/diamines include aliphatic diamines such as 1,4-diaminobutane, 1,5-diaminopentane, 1,6-diaminohexane, 2-methyl-1,5-diaminopentane (MDP), 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diminononadecane, 1,20-diaminoeicosane; alicyclic diamines such as cyclohexanediamine, bis-(4-aminohexyl)methane; aromatic diamines such as m-xylylenediamine, p-xylylenediamine; etc. Especially preferred are aliphatic diamines, and more preferred is hexamethylenediamine. Two or more of those diamines may be used, as combined.

As will be mentioned hereinunder, the aminocarboxylic acid and the salt of dicarboxylic acid/diamine, when added to the monomer in the polymerization step, function as a catalyst and also as an oligomer production inhibitor. Therefore, adding any of aminocarboxylic acids or salts of dicarboxylic acids/diamines such as those noted above, or their mixtures to the polymerization system is preferred. Especially preferred are salts of dicarboxylic acids/diamines. Above all, preferred are salts derived from aliphatic and/or aromatic dicarboxylic acids and aliphatic diamines. More preferred are salts derived from adipic acid and aliphatic diamines, or salts derived from dicarboxylic acids and hexamethylenediamine; and even more preferred are salts derived from adipic acid and hexamethylenediamine. The amount of the additive component to is preferably at most 20 mol %, more preferably at most 10 mol % of the total amount of all starting compounds.

The reactor for polymerization to produce polyamides in the invention is not specifically defined, provided that it is fit for the polymerization conditions. Generally employed are ordinary stainless steel autoclave, etc.

In the first step, the monomer is polymerized under atmospheric pressure into a polymerization product (polyamide) of which the unreacted caprolactam content and the oligomer content are both controlled as desired. The unreacted caprolactam content is not higher than 25% by weight, but preferably not higher than 20% by weight, more preferably not higher than 15% by weight, even more preferably not higher than 10% by weight. The unreacted caprolactam could be removed from the polymerization product in the second step in which the product is heated in a molten state or in a solid-phase state. However, if the polymerization product contains a large amount of the unreacted caprolactam of higher than 25% by weight before it is processed in the second step, satisfactory content of the unreacted caprolactam can not be achieved even in the second step, thereby resulting in that the quality of the final product is poor. On the other hand, the oligomer content of the polymerization product in the first step falls between 0 and 1.8% by weight, preferably between 0 and 1.5% by weight, more preferably between 0 and 1.3% by weight. Since the oligomer is less volatile than caprolactam, the oligomer removal is much lower than the caprolactam removal when the polymerization product is heated in a molten state or in a solid-phase state in the second step. Therefore, for ensuring good quality of the final product, it is necessary that the oligomer content of the polymerization product to be prepared in the first step is controlled at most up to the level of the above-mentioned range.

The polymerization condition in the first step is not specifically defined, provided that the unreacted caprolactam content and the oligomer content of the polyamide (polymerization product) as prepared therein by atmospheric pressure polymerization process are both at most up to the intended level of the afore-mentioned ranges. For example, herein employable is the following polymerization condition.

The unreacted caprolactam content and the oligomer content of the polymerization product to be prepared in the first step of polymerization mainly depend on the polymerization temperature and the polymerization time. For example, the unreacted caprolactam content could be reduced when the polymerization is effected at a low temperature for a long period of time or at a high temperature for a very short period of time. However, irrespective of the polymerization condition employed, the amount of the unreacted caprolactam in the polymerization system which have reached polymerization equilibrium could no more be reduced even though the polymerization time is further prolonged.

On the other hand, the oligomer content of the polyamide prepared in the first step does not increase so much even when the polymerization in the first step is conducted at a low polymerization temperature for a long period of time, but shall significantly increase at high polymerization temperatures even within a short period of time. In any polymerization condition, however, the amount of the oligomer in the polymerization product in the first step gradually increases with the polymerization time.

In general, at low polymerization temperatures, the polymerization time must be prolonged in order to obtain a desired degree of polymerization. In that situation, adding an aminocarboxylic acid and/or a salt of dicarboxylic acid/diamine to caprolactam to be polymerized is advantageous in that the added component acts as an activator to accelerate the polymerization rate. With the additional component, the polymerization time is no more prolonged even though the polymerization temperature is lowered. In addition, the additive component, aminocarboxylic acid or salt of dicarboxylic acid/diamine acts also as an oligomer production inhibitor. Therefore, adding the additive component, aminocarboxylic acid or salt of dicarboxylic acid/diamine to the polymerization system is further advantageous in that the amount of the oligomer produced is reduced. The effect is remarkable when a salt of dicarboxylic acid/diamine is used as the additive component. It is also remarkable when the polymerization temperature is lower.

The amount of the aminocarboxylic acid or the salt of dicarboxylic acid/diamine to be used is not specifically defined. However, for aminocarboxylic acids or salts of dicarboxylic acids/diamines that form repeating units differing from those formed in polymerization of caprolactam, if too much amount of the additive component is added to the polymerization system, the melting point and even the mechanical properties of the polyamide produced will vary. Therefore, their amount to be added should be determined accordingly to the intended physical properties of the product.

The polymerization temperature in the first step is not specifically defined. In consideration of the quality of the final product, however, lower polymerization temperature therein is preferable. As so mentioned hereinabove, caprolactam is generally polymerized in melt. In ordinary melt polymerization, the polymerization temperature is higher than the melting point (in general, 224° C.) of the final product, in order that the polyamide produced is not solidified in the polymerization step. In general, the polymerization temperature may fall between 240 and 270° C. Through our studies, however, we, the present inventors have found that even when caprolactam is polymerized in melt at temperatures lower than the melting point (in general, 224° C.) of the final product, polyamide, at which the polymerization system is in a "supercooled" condition, for a long period of time, the resulting product, polyamide is not solidified, or that is, the monomer is polymerized into polyamide with no solidification in that supercooled condition, as in ordinary melt polymerization.

Therefore, in the first step, it is desirable that the polymerization system is gradually heated from low temperatures up to a highest temperature of not higher than 235° C. while the time for polymerization in the "supercooled" condition at a temperature not higher than the melting point of the product is at lest 70%, preferably at least 80%, more preferably at least 90% of the total polymerization time in the step. More preferably, in the first step, the highest temperature for the polymerization is not higher than the melting point (in general, 224° C.) of the product, even more preferably the polymerization is conducted in the "supercooled" condition throughout the entire polymerization time.

In the invention, the first step of polymerization is followed by the second step of heating the polymerization product prepared in the first step in a molten state or in a solid-phase state, under reduced pressure to thereby remove the unreacted caprolactam and the oligomer from it. The heating temperature in the second step may be higher than the glass transition point of the final product, but shall fall within the range within which properties of the polyamide are not deteriorated and its commercial value is not lost. In general, the heating temperature T in the second step satisfies the following formula (1):

Glass transition point of polyamide<T<melting point of polyamide+150° C. (1)

wherein the glass transition point and melting point of the polyamide are measured by differential scanning calorimetry (DSC) are using samples prepared by rapidly cooling a molten sample with a heating rate of 20° C./min. The glass transition point is defined as the inflection point in the specific heat profile of the polyamide, and melting point is determined as the peak top temperature in the endothermic peak based on the crystal fusion of the polyamide.

The temperature at which the polymerization product is heated in the second step generally falls between 80 and 370° C., but preferably between 100 an 350° C., more preferably between 120 and 320° C., even more preferably between 150 and 300° C.

The pressure in the heating step generally falls between 0.01 and 700 mmHg, but preferably between 0.05 and 600 mmHg, more preferably between 0.1 and 500 mmHg, even more preferably between 0.2 and 400 mmHg. If heated in the presence of oxygen, polyamides are often discolored and deteriorated. Therefore, in the second step of the invention, the oxygen concentration in the heating atmosphere is at most 500 ppm, more preferably at most 100 ppm.

The heating apparatus, which is equipped with a apparatus for removing the unreacted caprolactam and the oligomer, is not specifically defined. For example, when the polymerization product is heated in a molten state, employable are any ordinary vented, twin-screw extruders, as well as stirring-type thin film evaporators such as those described in JP-A 8-259699, 8-283417, 3-275102 and 3-60701, and the like. On the other hand, when it is heated in a solid-phase state, employable are any ordinary solid-phase polymerization reactors and the like.

The relative viscosity of the final polyamide in a 0.01 g/ml solution of sulfuric acid at 25° C. falls between 2.2 and 8.0, but preferably between 2.2 and 7.0, more preferably between 2.2 and 6.5, even more preferably between 2.2 and 6.0. If its relative viscosity ($\eta r$) is smaller than 2.2, the polyamide could hardly have the intended mechanical properties; but, on the contrary, if larger than 8.0, the melt viscosity of the polyamide is so high that molding the polyamide will be difficult.

In the production method of the invention, if desired, the terminal groups of polyamide may be end-capped with a carboxylic acid compound or an amine compound. When monocarboxylic acids and/or monoamines are used for the end-capping, the terminal group concentration of the polyamide is lower than that of the non end-capped polyamide. On the other hand, when dicarboxylic acids or diamines are used for the end-capping, the total terminal group concentration in the end-capped polyamide does not change, but the ratio of the concentration of amino terminal groups to that of the carboxyl terminal groups therein changes.

Specific examples of the carboxylic acid compounds include aliphatic monocarboxylic acids such as acetic acid, propionic acid, butyric acid, valeric acid, caproic acid, enanthic acid, caprylic acid, pelargonic acid, undecanoic acid, lauric acid, tridecanoic acid, myristic acid, myristoleic acid, palmitic acid, stearic acid, oleic acid, linolic acid, arachic acid; alicyclic monocarboxylic acids such as cyclohexanecarboxylic acid, methylcyclohexanecarboxylic acid; aromatic monocarboxylic acids such as benzoic acid, toluic acid, ethylbenzoic acid, phenylacetic acid; aliphatic dicarboxylic acids such as oxalic acid, malonic acid, succinic acid, glutaric acid, adipic acid, pimelic acid, suberic acid, azelaic acid, sebacic acid, nonanedicarboxylic acid, decanedicarboxylic acid, brassylic acid, deodecanedicarboxylic acid, tridecanedicarboxylic acid, hexadecanedicarboxylic acid; alicyclic dicarboxylic acids such as cyclohexane dicarboxylic acid; aromatic dicarboxylic acids such as phthalic acid, isophthalic acid, terephthalic acid, napthalene dicarboxylic acid; etc.

Specific examples of the amine compounds include aliphatic monamines such as butylamine, pentylamine, hexylamine, heptylamine, octylamine, 2-ethylhexlamine, nonylamine, decylamine, undecylamine, dodecylamine, tridecylamine, tetradecylamine, pentadecylamine, hexadecylamine, octadecylamine, nonadecylamine, eicosylamine; alicyclic monamines such as cyclohexylamine, methylcyclohexylamine; aromatic monoamines such as benzylamine, β-phenylethylamine; aliphatic diamines such as 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane; alicyclicdiamines such as cyclohexanediamine, bis-(4-aminohexyl)methane; aromatic diamines such as xylylenediamine; etc.

The terminal group concentration in the polyamide obtained according to the production method of the invention is not specifically defined. However, when the polyamide is used for fibers, and therefore, its dyeability is desired to increase, or the polyamide is used as a base resin for polymer alloys, it is desirable that the terminal amino group concentration in the polyamide is higher. On the other hand, however, when the polyamide shall be prevented from being discolored or gelled under long-term aging conditions, it is rather desirable that the terminal amino group concentration in the polyamide is lower. In addition, when breakage in melt-spinning the polyamide, which may be caused by the lactam reproduction and the oligomer production in re-melting the polyamide, shall be prevented, when in-mold deposition in continuous injection molding of the polyamide shall be prevented, and when formation of die marks in continuous extrusion of the polyamide into films shall be prevented, it is desirable that the terminal carboxyl group concentration and the terminal amino group concentration in the polyamide are both lower. Depending on the use of the polyamide, the terminal group concentration in the polyamide could be well controlled. The terminal amino group concentration and the terminal carboxyl group concentration in the polyamide both preferably fall between $1.0 \times 10^{-5}$ and $15.0 \times 10^{-5}$ eq/g, more preferably between $2.0 \times 10^{-5}$ and $12.0 \times 10^{-5}$ eq/g, even more preferably between $3.0 \times 10^{-5}$ and $11.0 \times 10^{-5}$ eq/g.

For adding the end-capping agent to the polymerization system of the invention, employable is any of a method feeding it thereto along with the polmerizing material of caprolactam and others in the initial stage of polymerization; a method of adding it thereto in the halfway through polymerization; or a method of adding it thereto in the step of removing the unreacted caprolactam and the oligomer from the molten polyamide. The end-capping agent may be used as it is, or after having been dissolved in a small amount of a solvent.

In the production method of the invention, if desired, any additive may be added at any time to the polymerization system, depending on the use of the final polyamide. For example, the additive includes antioxidants and thermal stabilizers (hindered phenols, hydroquinones, phosphites, and their substituted derivatives, copper halides, iodine compounds, etc.), anti-weathering agents (resorcinols, salicylates, benzotriazoles, benzophenones, hindered amines, etc.), mold releasing agents and lubricants (aliphatic alcohols, aliphatic amides, aliphatic bisamides, bisurea, polyethylene wax, etc.), pigments (cadmium sulfide phathalocyanines, carbon black, etc.), dyes (nigrosines, aniline black, etc.), nucleating agents (talc, silica, kaolin, clay, etc.), plasticizers (octyl p-hydroxybenzoate, N-butylbenzenesulfonamide, etc.), antistatic agents (alkylsulfate-type anionic antistatic agents, quaternary ammonium-type cationic antistatic agents, nonionic antistatic agents such as polyoxyethylene sorbitan monostearate, betaine-type amphoteric antistatic agents, etc.), flame reatardants (melamine cyanurates; hydroxides such as magnesium hydroxide, aluminum hydroxide, etc.; ammonium polyphosphates; brominated polystyrene, brominated polyphenylene oxide, brominated polycarbonate, brominated epoxy resins; combinations of those bromine-containing flame retardants and antimony oxide; etc.), fillers (granular, fibrous, needle-like and tabular fillers of graphite, barium sulfate, magnesium sulfate, calcium carbonate, magnesium carbonate, antimony oxide, titanium oxide, aluminium oxide, zinc oxide, iron oxide, zinc sulfide, zinc, lead, nickel, aluminium, copper, iron, stainless steel, glass fibers, carbon fibers, aramide fibers, etc.), and other polymers (other polyamides, polyethylenes, polypropylenes, polyesters, polycarbonates, polyphenylene ethers, polyphenylene sulfides, liquid-cyrstalline polymers, polysuflones, polyether sulfones, ABS resins, SAN resins, polystyrenes, etc.).

The polyamide obtained according to the production method of the invention can be molded into moldings in any ordinary molding methods, like conventional caprolactam-based polyamides. Moldings as referred to herein include not only injection moldings and the like in the narrow sense of the word but also fibers, films and others.

EXAMPLES

The invention is described conceretely with reference to the following Examples. In those Examples and Comparative Examples, the samples were analyzed and measured according to the methods mentioned below.

(1) Caprolactam Content:

A polyamide sample is subjected to Soxhlet extraction with methanol, and the caprolactam content of the resulting extract is quantitatively determined by gas chromatography according to an internal standard method. The condition for the measurement is mentioned below.

Gas chromatography: Shimadzu GC-17A

Column: J & W Scientific's capillary column, DB-1

Injector temperature: 250° C.

Detector temperature: 250° C.

Column temperature; 150 to 210° C. (heating rate, 5° C./min)

Internal standard: naphthalene (2) Oligomer Content:

A polyamide sample is subjected to Soxhlet extraction with methanol, and the caprolactam content of the resulting extract is quantitatively determined according to the method mentioned above. Then, the extract is evaporated using an evaporator, and dried in vacuum overnight. The amount of the residue is measured, which indicates the oligomer content of the sample.

(3) Carboxyl Terminal Group Concentration ([COOH]):

From 0.5 to 2.0 g of a polyamide sample is accurately weighed, and dissolved in 20 ml of benzyl alcohol at 195° C. To the resulting solution, added is an indicator, phenolphthalein, and this is titrated with 0.02 N KOH ethanol solution.

(4) Amino Terminal Group Concentration ([NH$_2$]):

From 0.5 to 2.0 g of a polyamide sample is accurately weighed, and dissolved in 25 ml of a mixed solution of phenol/ethnaol (84/16, % by weight) at room temperature. To the resulting solution, added is an indicator, Thymol Blue, and this is titrated with 0.02 N HCl.

(5) Glass Transition Point and Melting Point:

About 7 mg of a polyamide ample prepared by rapidly cooling the molten sample is accurately weighed, and its glass transition point and melting point are measured with Perkin-Elmer's DSC-7 at a heating rate of 20° C./min.

(6) Tensile Properties:

The tensile strength and the elongation at break of each polyamide sample are measured according ASTM D638.

(7) Izod Impact Value:

The Izod impact value of each polyamide sample is measured according to ASTM D256.

(8) Flexural Properties:

The flexural properties of each polyamide sample are measured according to ASTM D790.

(9) Mold Deposition in Continuous Injection Molding (for continuous moldability):

Using a 3.5-ounce injection-molding machine, a polyamide sample is continuously molded into test pieces with a thickness of 3 mm, a length of 120 mm and a width of 20 mm. During the continuous injection molding, the resin temperature is 258° C., and the mold temperature is 81° C. The surface of each molded piece is checked with the eyes, and the number of shots at which the surface haze has become remarkable is counted.

(10) Die Marks in Extrusion Molding into Films (for continuous film-formability):

Using a 45-mmΦ extruder with a 80-mm ring die, a polyamide sample is continuously formed into inflation films with a thickness of 60 $\mu$, at a resin temperature of 258° C. The surface of each inflation film is checked with the eyes, and the time at which diemarks has begun to appear.

(11) Color:

The color of pellets of each polyamide sample is checked with the eyes.

The staring materials used for polymerization in the following Examples and Comparative Examples are as follows.

ε-caprolactam: A special-grade chemical of ε-caprolactam from Tokyo Chemical industry is melted and dried with molecular sieves.

Laurolactam: A special-grade chemical of laurolactam from Tokyo Chemical industry is melted and dried with molecular sieves.

6-Aminohexanoic acid: A special-grade chemical of 6-aminohexanoic acid from Tokyo Chemical Industry is used. 12-Aminododecanoic acid: A first-grade chemical of 12-aminododecanoic acid from Tokyo Chemical Industry is used. Hexamethylenediamine/adipic acid salt (AH salt): A commercial product of hexamethylenediamine/adipic acid salt from BASF is used.

Benzoic acid (PhCOOH): A special-grade chemical of benzoic acid from Tokyo Chemical Industry is used as the terminal capping agent.

Example 1

1000 g of ε-caprolactam, 20 g of water were fed into a 3-liter stainless steel autoclave, which was then purged with nitrogen and closed. The materials were polymerized under the condition shown in Table 1 (first step) to prepare a polyamide. The polyamide prepared in the first step was analyzed, and its data are shown in the upper part of Table 1. The resulting polyamide was then transferred into an apparatus in which the unreacted caprolactam and the oligomer are to be removed, and heated therein under reduced pressure in a molten state (second step). The reaction condition in the second step and the analytical data of the final product are shown in the lower part of Table 1.

For removing the unreacted caprolactam and the oligomer in the second step, used was the following apparatus (A) under the condition mentioned below.

(A) 30 mmΦ-vented, twin-screw extruder (L/D=45.5; the two screws are deep grooved and rotate in the same direction; the barrel temperature were set at 160°C./240° C./250° C./260° C./260° C./260° C./260° C./250°C./250° C. in that order from the feeder; vacuum was conducted at the second, fourth and sixth zones with 5 mmHg; and the number of rotation is 80 rpm).

Examples 2 to 16

Polyamides were produced in the same manner as in Example 1, except that the materials shown in Tables 1 to 3 were used and polymerized under the condition shown therein (first step) and the polymerization product in the first step was heated under the condition also shown in those Tables (second step). The analytical data of the polyamides prepared in the first step and those of the final polyamides are shown in Tables 1 to 3.

For removing the unreacted caprolactam and the oligomer, used was the apparatus (A) under the condition mentioned above, or the following apparatus (B) under the condition mentioned below.

(B) Vertical, stirring-type thin-film evaporator equipped with a cylinder having an inner diameter of 150 mmΦ and a height of 450 mm and with inclined, multi-stage stirring blades that rotate in the cylinder with a clearance of 2 mm between each blade and the inner wall of the cylinder (the inclined angle of each stirring blade is 45° relative to the vertical direction, the temperature is 250° C., the pressure is 1 mmHg, and the number of rotation is 800 rpm).

Comparative Examples 1 and 2

The same process as in the first step in Example 1 was repeated, except that the starting material was polymerized under the condition shown in Table 4. The resulting polymerization products were then heated in the second step under the same condition as in Example 1, to prepare polyamides. The analytical data of the polyamides prepared in the first step and those of the final polyamides are shown in Table 4.

Reference Examples 1 and 2

The same process as in the first step in Example 1 was repeated, except that the starting material was polymerized under the condition shown in Table 4. The resulting polymerization products were then extracted with water at 100° C. for 20 hours, and thereafter dried at 80° C. in vacuum overnight. The analytical data of the polyamides prepared in the first step and those of the final polyamides are shown in Table 4.

TABLE 1

|  | Example 1 | Example 2 | Example 3 | Example 4 | Example 5 | Example 6 |
|---|---|---|---|---|---|---|
| Polymerization Starting Materials |  |  |  |  |  |  |
| ε-caprolactam (mol %) | 100 | 98 | 98 | 98 | 98 | 98 |
| 6-aminohexanoic acid (mol %) | — | 2 | — | — | 1 | — |
| 12-aminododecanoic acid (mol %) | — | — | 2 | — | — | 1 |
| AH salt (mol %) | — | — | — | 2 | 1 | 1 |
| PhCOOH terminal-blocking agent (mol %) | — | — | — | — | — | — |
| Polymerization temperature (highest) (° C.) | 240 | 245 | 240 | 245 | 240 | 245 |
| Polymerization time (hrs) | 33 | 12 | 13 | 12 | 13 | 12 |
| Proportion of time for polymerization effected at a temperature lower than the melting point of polyamide (%) | 75 | 90 | 90 | 90 | 90 | 90 |
| ηr | 2.53 | 2.54 | 2.52 | 2.51 | 2.51 | 2.55 |
| Glass transition point (° C.) | 48 | 48 | 47 | 47 | 47 | 47 |
| [NH$_2$] (10$^{-5}$ mol/g) | 5.95 | 5.90 | 5.98 | 6.03 | 6.00 | 5.88 |
| [COOH] (10$^{-5}$ mol/g) | 5.94 | 5.88 | 5.96 | 6.01 | 5.99 | 5.86 |
| Caprolactam content (wt. %) | 8.75 | 8.90 | 8.88 | 8.72 | 8.80 | 8.87 |
| Oligomer content (wt. %) | 1.78 | 1.65 | 1.64 | 1.52 | 1.57 | 1.56 |
| Lactam and Oligomer Removal |  |  |  |  |  |  |
| Method for lactam and oligomer removal | (A) | (A) | (A) | (A) | (A) | (A) |
| ηr | 2.77 | 2.77 | 2.75 | 2.76 | 2.74 | 2.78 |
| Melting point (° C.). | 224 | 224 | 222 | 223 | 223 | 223 |
| [NH$_2$] (10$^{-5}$ mol/g) | 5.12 | 5.08 | 5.19 | 5.16 | 5.22 | 5.09 |
| [COOH](10$^{-5}$ mol/g) | 5.09 | 5.10 | 5.16 | 5.13 | 5.18 | 5.07 |
| Caprolactam content (wt. %) | 0.10 | 0.08 | 0.07 | 0.09 | 0.09 | 0.08 |
| Oligomer content (wt. %) | 1.24 | 1.17 | 1.18 | 1.07 | 1.13 | 1.13 |
| Tensile strength (Mpa) | 76 | 75 | 74 | 74 | 74 | 73 |
| Tensile breaking elongation (%) | 203 | 208 | 218 | 219 | 217 | 216 |
| Modulus of bending elasticity (GPa) | 2.56 | 2.57 | 2.55 | 2.55 | 2.55 | 2.56 |
| Izod impact value (J/m) | 50 | 50 | 51 | 52 | 52 | 52 |
| Continuous moldability (shots) | 2000 | 2100 | 2100 | 2200 | 2100 | 2200 |
| Continuous film-formability (hrs) | — | — | — | — | — | — |
| Color tone | white | white | white | white | white | white |

TABLE 2

|  | Example 7 | Example 8 | Example 9 | Example 10 | Example 11 | Example 12 |
|---|---|---|---|---|---|---|
| Polymerization Starting Materials | | | | | | |
| ε-caprolactam (mol %) | 100 | 98 | 100 | 98 | 98 | 98 |
| 6-aminohexanoic acid (mol %) | — | — | — | 2 | — | — |
| 12-aminododecanoic acid (mol %) | — | — | — | — | 2 | — |
| AH salt (mol %) | — | 2 | — | — | — | 2 |
| PhCOOH terminal-blocking agent (mol %) | — | 0.5 | — | — | — | — |
| Polymerization temperature (highest) (° C.) | 240 | 245 | 223 | 223 | 223 | 223 |
| Polymerization time (hrs) | 46 | 12 | 54 | 15 | 16 | 16 |
| Proportion of time for polymerization effected at a temperature lower than the melting point of polyamide (%) | 74 | 90 | 100 | 100 | 100 | 100 |
| $\eta r$ | 2.92 | 2.54 | 2.52 | 2.51 | 2.51 | 2.55 |
| Glass transition point (° C.) | 48 | 48 | 47 | 47 | 47 | 47 |
| $[NH_2]$ ($10^{-5}$ mol/g) | 4.73 | 5.03 | 5.95 | 6.00 | 6.04 | 5.85 |
| $[COOH]$ ($10^{-5}$ mol/g) | 4.80 | 5.79 | 5.92 | 5.99 | 5.97 | 5.84 |
| Caprolactam content (wt. %) | 7.99 | 8.86 | 8.76 | 8.73 | 8.78 | 8.74 |
| Oligomer content (wt. %) | 1.79 | 1.53 | 1.58 | 1.44 | 1.44 | 1.32 |
| Lactam and Oligomer Removal | | | | | | |
| Method for lactam and oligomer removal | (A) | (A) | (B) | (B) | (B) | (B) |
| $\eta r$ | 3.34 | 2.67 | 2.75 | 2.76 | 2.74 | 2.78 |
| Melting point (° C.) | 224 | 223 | 224 | 224 | 223 | 223 |
| $[NH_2]$ ($10^{-5}$ mol/g) | 3.85 | 4.48 | 5.16 | 5.14 | 5.20 | 5.10 |
| $[COOH]$ ($10^{-5}$ mol/g) | 3.81 | 5.50 | 5.15 | 5.14 | 5.19 | 5.06 |
| Caprolactam content (wt. %) | 0.09 | 0.08 | 0.10 | 0.08 | 0.08 | 0.09 |
| Oligomer content (wt. %) | 1.24 | 1.07 | 1.20 | 1.13 | 1.14 | 1.04 |
| Tensile strength (Mpa) | 75 | 75 | 76 | 76 | 74 | 74 |
| Tensile breaking elongation (%) | 247 | 208 | 204 | 206 | 217 | 216 |
| Modulus of bending elasticity (GPa) | 2.54 | 2.56 | 2.56 | 2.57 | 2.55 | 2.55 |
| Izod impact value (J/m) | 61 | 50 | 50 | 50 | 52 | 52 |
| Continuous moldability (shots) | — | 2200 | 2300 | 2400 | 2400 | 2500 |
| Continuous film-formability (hrs) | 64 | — | — | — | — | — |
| Color tone | white | white | white | white | white | white |

TABLE 3

|  | Example 13 | Example 14 | Example 15 | Exampte 16 |
|---|---|---|---|---|
| Polymerization Starting Materials | | | | |
| ε-caprolactam (mol %) | 98 | 98 | 100 | 98 |
| 6-aminohexanoic acid (mol %) | 1 | — | — | — |
| 12-aminododecanoic acid (mol %) | — | 1 | — | — |
| AH salt (mol %) | 1 | — | — | 2 |
| PhCOOH terminal-blocking agent (mol %) | — | — | — | 0.5 |
| Polymerization temperature (highest) (° C.) | 223 | 223 | 223 | 223 |
| Polymerization time (hrs) | 16 | 15 | 66 | 15 |
| Proportion of time for polymerization effected at a temperature lower than the melting point of polyamide (%) | 100 | 100 | 100 | 100 |
| $\eta r$ | 2.53 | 2.54 | 2.91 | 2.54 |
| Glass transition point (° C.) | 48 | 48 | 47 | 48 |
| $[NH_2]$ ($10^{-5}$ mol/g) | 5.95 | 5.80 | 4.75 | 5.02 |
| $[COOH]$ ($10^{-5}$ mol/g) | 5.94 | 5.88 | 4.74 | 5.88 |
| Caprolactam content (wt. %) | 8.75 | 8.90 | 7.99 | 8.90 |
| Oligomer content (wt. %) | 1.38 | 1.37 | 1.66 | 1.32 |
| Lactam and Oligomer Removal | | | | |
| Method for lactam and oligomer removal | (B) | (B) | (B) | (B) |
| $\eta r$ | 2.77 | 2.77 | 3.34 | 2.67 |
| Melting point (° C.) | 223 | 223 | 224 | 223 |
| $[NH_2]$ ($10^{-5}$ mol/g) | 5.11 | 5.07 | 3.83 | 4.46 |
| $[COOH]$ ($10^{-5}$ mol/g) | 5.07 | 5.06 | 3.80 | 5.49 |

TABLE 3-continued

|  | Example 13 | Example 14 | Example 15 | Example 16 |
|---|---|---|---|---|
| Caprolactam content (wt. %) | 0.07 | 0.08 | 0.10 | 0.08 |
| Oligomer content (wt. %) | 1.10 | 1.11 | 1.20 | 1.03 |
| Tensile strength (Mpa) | 74 | 74 | 75 | 75 |
| Tensile breaking elongation (%) | 216 | 214 | 249 | 208 |
| Modulus of bending elasticity (GPa) | 2.56 | 2.56 | 2.54 | 2.57 |
| Izod impact value (J/m) | 51 | 51 | 62 | 50 |
| Continuous moldability (shots) | 2400 | 2500 | — | 2500 |
| Continuous film-formability (hrs) | — | — | 69 | — |
| Color tone | white | white | white | white |

TABLE 4

|  | Reference Example 1 | Reference Example 2 | Comparative Example 1 | Comparative Example 2 |
|---|---|---|---|---|
| Polymerization Starting Materials |  |  |  |  |
| ε-caprolactam (mol %) | 100 | 100 | 100 | 100 |
| 6-aminohexanoic acid (mol %) | — | — | — | — |
| 12-aminododecanoic acid (mol %) | — | — | — | — |
| AH salt (mol %) | — | — | — | — |
| PhCOOH terminal-blocking agent (mol %) | — | — | — | — |
| Polymerization temperature (highest) (° C.) | 260 | 260 | 260 | 260 |
| Polymerization time (hrs) | 15 | 20 | 13 | 17 |
| Proportion of time for polymerization effected at a temperature lower than the melting point of polyamide (%) | 20 | 15 | 23 | 18 |
| ηr | 2.72 | 3.43 | 2.54 | 2.93 |
| Glass transition point (° C.) | 48 | 48 | 48 | 48 |
| [$NH_2$] ($10^{-5}$ mol/g) | 5.29 | 3.72 | 5.91 | 4.73 |
| [COOH] ($10^{-5}$ mol/g) | 5.19 | 3.81 | 5.87 | 4.80 |
| Caprolactam content (wt. %) | 8.29 | 8.45 | 8.80 | 7.99 |
| Oligomer content (wt. %) | 2.41 | 2.71 | 2.50 | 2.52 |
| Lactam and Oligomer Removal |  |  |  |  |
| <Condition> | Hot water extraction | Hot water extraction | Same as in Example 1 | Same as in Example 1 |
| ηr | 2.71 | 3.42 | 2.76 | 3.34 |
| Melting point (° C.) | 224 | 224 | 224 | 224 |
| [$NH_2$] ($10^{-5}$ mol/g) | 5.38 | 3.77 | 5.13 | 3.83 |
| [COOH] ($10^{-5}$ mol/g) | 5.29 | 3.81 | 5.08 | 3.81 |
| Caprolactam content (wt. %) | 0.06 | 0.07 | 0.08 | 0.09 |
| Oligomer content (wt %) | 1.19 | 1.18 | 1.91 | 1.93 |
| Tensile strength (Mpa) | 75 | 76 | 75 | 76 |
| Tensile breaking elongation (%) | 212 | 255 | 214 | 254 |
| Modulus of bending elasticity (GPa) | 2.55 | 2.54 | 2.55 | 2.54 |
| Izod impact value (J/m) | 51 | 61 | 50 | 60 |
| Continuous moldability (shots) | 2400 | — | 1600 | — |
| Continuous film-formability (hrs) | — | 68 | — | 45 |
| Color tone | white | white | white | white |

Comparing the data in Examples 1 to 16 with those in Reference Examples 1 to 2, it is known that the quality of the polyamides obtained according to the production method of the invention comprising reduced-pressure melt treatment but not hot water extraction is comparable to that of the polyamides obtained according to the production method comprising conventional hot water extraction. This means that the production method of the invention not comprising hot water extraction is highly efficient and produces high-quality polyamides.

Comparing the data in Examples 1, 7, 9 and 15 with those in Examples 2 to 6, 8, 10 to 14 and 16, it is known that adding the aminocarboxylic acid and/or the dicarboxylic acid/diamine salt to the polymerization system reduces the polymerization time compared with the polymerization system to which the additive component was not added. This means that the additive component is favorable for increasing the production efficiency and for obtaining high-quality polyamides.

Comparing the data in Examples 1 to 8 with those in Examples 9 to 16, it is known that the polymerization temperature in the first step lower than the melting point of the final polyamide is favorable for reducing the amount of the oligomer and this result leads to much more reduction of the oligomer content of the final polyamide obtained in the second step.

As opposed to those, the data in Comparative Examples 1 and 2 indicate that, when the polyamides produced in conventional polymerization with a high oligomer content are subjected to the second step of the invention for removing the unreacted caprolactam and the oligomer, the oligomer could not be fully removed from the polyamides, and, as a result, high-quality polyamides could not be obtained in the method of those Comparative Examples 1 and 2.

Example 17

1000 g of ε-caprolactam, 20 g of water were fed into a 3-liter stainless steel autoclave, which was then purged with nitrogen and closed. The materials were polymerized under the condition shown in Table 5 (first step) to prepare a polyamide. The polyamides prepared in the first step were analyzed, and their data are shown in Table 5. The resulting polyamide pellets were put into a double-coned vacuum direr, and heated therein under reduced pressure in a solid-phase state. While the direr was rotated, the unreacted caprolactam and the oligomer were removed from the pellets (second step). The reaction condition and the analytical data of the final polyamide are shown in Table 5.

Examples 18 to 32

Polyamides were produced in the same manner as in Example 17, except that the materials shown in Tables 5 to 7 were used and polymerized under the condition shown therein (first step) and the polymerization product in the first step was heated in a solid-phase state under the condition also shown in those Tables (second step). The analytical data of the polyamides prepared in the first step and those of the final polyamides are shown in Tables 5 to 7.

Comparative Examples 3 and 4

The same process as in the first step in Example 17 was repeated, except that the starting material was polymerized under the condition shown in Table 7. The resulting polymerization products were then heated in the second step under the same condition as in Example 17 or 23. The analytical data of the polyamides prepared in the first step and those of the final polyamides are shown in Table 7.

TABLE 5

| | Example 17 | Example 18 | Example 19 | Example 20 | Example 21 | Example 22 |
|---|---|---|---|---|---|---|
| Polymerization Starting Materials | | | | | | |
| ε-caprolactam (mol %) | 100 | 98 | 98 | 98 | 98 | 98 |
| 6-aminohexanoic acid (mol %) | — | 2 | — | — | 1 | — |
| 12-aminododecanoic acid (mol %) | — | — | 2 | — | — | 1 |
| AH salt (mol %) | — | — | — | 2 | 1 | 1 |
| PhCOOH terminal-blocking agent (mol %) | — | — | — | — | — | — |
| Polymerization temperature (highest) (° C.) | 240 | 245 | 240 | 245 | 240 | 245 |
| Polymerization time (hrs) | 29 | 10 | 11 | 10 | 11 | 10 |
| Proportion of time for polymerization effected at a temperature lower than the melting point of polyamide (%) | 75 | 90 | 90 | 90 | 90 | 90 |
| ηr | 2.12 | 2.09 | 2.07 | 1.89 | 1.92 | 2.04 |
| Glass transition point (° C.) | 48 | 48 | 47 | 47 | 47 | 47 |
| $[NH_2]$ ($10^{-5}$ mol/g) | 8.43 | 8.52 | 8.66 | 10.5 | 10.2 | 8.93 |
| $[COOH]$ ($10^{-5}$ mol/g) | 8.56 | 8.71 | 8.69 | 10.9 | 11.0 | 9.01 |
| Caprolactam content (wt. %) | 8.79 | 8.89 | 8.87 | 8.78 | 8.81 | 8.76 |
| Oligomer content (wt. %) | 1.79 | 1.69 | 1.68 | 1.55 | 1.66 | 1.67 |
| Lactam and Oligomer Removal | | | | | | |
| Heating temperature (° C.) | 200 | 190 | 195 | 205 | 210 | 200 |
| Healing Time (hrs) | 9 | 12 | 11 | 9 | 14 | 15 |
| Atmosphere (or vacuum, mmHg) | 1.0 | 0.5 | 1.0 | 0.5 | nitrogen stream | nitrogen stream |
| ηr | 2.73 | 2.65 | 2.83 | 2.69 | 2.75 | 2.81 |
| Melting point (° C.) | 224 | 224 | 222 | 223 | 223 | 223 |
| $[NH_2]$ ($10^{-5}$ mol/g) | 5.27 | 5.53 | 4.99 | 5.39 | 5.21 | 5.04 |
| $[COOH]$ ($10^{-5}$ mol/g) | 5.36 | 5.42 | 5.04 | 5.33 | 5.41 | 5.08 |
| Caprolactam content (wt. %) | 0.06 | 0.07 | 0.06 | 0.08 | 0.12 | 0.11 |
| Oligomer content (wt. %) | 1.23 | 1.18 | 1.17 | 1.08 | 1.14 | 1.14 |
| Tensile strength (Mpa) | 76 | 75 | 74 | 74 | 74 | 73 |
| Tensile breaking elongation (%) | 205 | 211 | 222 | 223 | 219 | 225 |
| Modulus of bending elasticity (GPa) | 2.55 | 2.58 | 2.59 | 2.57 | 2.56 | 2.57 |
| Izod impact value (J/m) | 49 | 50 | 53 | 52 | 52 | 53 |
| Continuous moldability (shots) | 2000 | 2100 | 2100 | 2200 | 2100 | 2200 |
| Continuous film-formability (hrs) | — | — | — | — | — | — |
| Color tone | white | white | white | white | white | white |

TABLE 6

|  | Example 23 | Example 24 | Example 25 | Example 26 | Example 27 | Example 28 |
|---|---|---|---|---|---|---|
| Polymerization Starting Materials | | | | | | |
| ε-caprolactam (mol %) | 100 | 98 | 100 | 98 | 98 | 98 |
| 6-aminohexanoic acid (mol %) | — | 1 | — | 2 | — | — |
| 12-aminododecanoic acid (mol %) | — | — | — | — | 2 | — |
| AH salt (mol %) | — | 1 | — | — | — | 2 |
| PhCOOH terminal-blocking agent (mol %) | — | 0.5 | — | — | — | — |
| Polymerization temperature (highest) (° C.) | 240 | 245 | 223 | 223 | 223 | 223 |
| Polymerization time (hrs) | 46 | 10 | 14 | 14 | 15 | 15 |
| Proportion of time for polymerization effected at a temperature lower than the melting point of polyamide (%) | 74 | 90 | 100 | 100 | 100 | 100 |
| $\eta r$ | 2.72 | 2.09 | 2.07 | 1.89 | 1.92 | 2.04 |
| Glass transition point (° C.) | 48 | 48 | 47 | 47 | 47 | 47 |
| [$NH_2$] ($10^{-5}$ mol/g) | 5.23 | 7.50 | 8.69 | 10.2 | 10.1 | 8.91 |
| [COOH] ($10^{-5}$ mol/g) | 5.18 | 8.72 | 8.61 | 10.6 | 11.3 | 8.99 |
| Caprolactam content (wt. %) | 8.74 | 8.80 | 8.78 | 8.83 | 8.69 | 8.82 |
| Oligomer content (wt. %) | 1.79 | 1.56 | 1.79 | 1.66 | 1.65 | 1.53 |
| Lactam and Oligomer Removal | | | | | | |
| Heating temperature (° C.) | 200 | 190 | 195 | 205 | 210 | 200 |
| Heating time (hrs) | 9 | 18 | 11 | 9 | 14 | 15 |
| Atmosphere (or vacuum mmHg) | 1.0 | 0.5 | 1.0 | 0.5 | nitrogen stream | nitrogen stream |
| $\eta r$ | 3.33 | 2.66 | 2.81 | 2.70 | 2.74 | 2.80 |
| Melting point (° C.) | 224 | 223 | 224 | 224 | 223 | 223 |
| [$NH_2$] ($10^{-5}$ mol/g) | 3.87 | 4.51 | 5.01 | 5.34 | 5.18 | 5.02 |
| [COOH] ($10^{-5}$ mol/g) | 3.83 | 5.40 | 5.05 | 5.36 | 5.36 | 5.03 |
| Caprolactam content (wt. %) | 0.08 | 0.08 | 0.09 | 0.08 | 0.10 | 0.12 |
| Oligomer content (wt. %) | 1.24 | 1.08 | 1.21 | 1.13 | 1.13 | 1.05 |
| Tensile strength (Mpa) | 75 | 75 | 74 | 74 | 74 | 74 |
| Tensile breaking elongation (%) | 244 | 211 | 222 | 223 | 219 | 225 |
| Modulus of bending elasticity (GPa) | 2.54 | 2.58 | 2.59 | 2.57 | 2.56 | 2.57 |
| Izod impact value (J/m) | 60 | 50 | 53 | 52 | 52 | 53 |
| Continuous moldability (shots) | — | 2200 | 2300 | 2400 | 2400 | 2500 |
| Continuous film-formability (hrs) | 63 | — | — | — | — | — |
| Color tone | white | white | white | white | white | white |

TABLE 7

|  | Example 29 | Example 30 | Example 31 | Example 32 | Comparative Example 3 | Comparative Example 4 |
|---|---|---|---|---|---|---|
| Polymerization Starting Materials | | | | | | |
| ε-caprolactam (mol %) | 98 | 98 | 100 | 98 | 100 | 100 |
| 6-aminohexanoic acid (mol %) | 1 | — | — | — | — | — |
| 12-aminododecanoic acid (mol %) | — | 1 | — | — | — | — |
| AH salt (mol %) | 1 | 1 | — | 2 | — | — |
| PhCOOH terminal-blocking agent (mol %) | — | — | — | 0.5 | — | — |
| Polymerization temperature (highest) (° C.) | 223 | 223 | 223 | 223 | 260 | 260 |
| Polymerization time | 15 | 13 | 59 | 14 | 7 | 15 |
| Proportion of time for polymerization effected at a temperature lower than the melting point of polyamide (%) | 100 | 100 | 100 | 100 | 14 | 20 |
| $\eta r$ | 2.12 | 2.09 | 2.71 | 1.89 | 2.13 | 2.71 |
| Glass transition point (° C.) | 48 | 48 | 47 | 47 | 48 | 48 |
| [$NH_2$] ($10^{-5}$ mol/g) | 8.39 | 8.49 | 5.25 | 9.46 | 8.40 | 5.27 |
| [COOH] ($10^{-5}$ mol/g) | 8.57 | 8.68 | 5.15 | 11.0 | 8.52 | 5.18 |
| Caprolactam content (wt. %) | 8.68 | 8.93 | 8.34 | 8.51 | 8.91 | 8.09 |
| Oligomer content (wt. %) | 1.58 | 1.57 | 1.56 | 1.54 | 2.60 | 2.43 |
| Lactam and Oligomer Removal | | | | | | |
| Heating temperature (° C.) | 200 | 190 | 195 | 205 | Same as in Example 17 | Same as in Example 23 |
| Heating time (hrs) | 9 | 12 | 11 | 16 | | |

TABLE 7-continued

|  | Example 29 | Example 30 | Example 31 | Example 32 | Comparative Example 3 | Comparative Example 4 |
|---|---|---|---|---|---|---|
| Atmosphere (or vacuum, mmHg) | 1.0 | 0.5 | 1.0 | 0.5 | | |
| ηr | 2.72 | 2.64 | 3.34 | 2.70 | 2.72 | 3.35 |
| Melting point (° C.) | 223 | 222 | 224 | 223 | 224 | 224 |
| [NH$_2$] (10$^{-5}$ mol/g) | 5.24 | 5.49 | 3.82 | 4.37 | 5.36 | 3.79 |
| [COOH] (10$^{-5}$ mol/g) | 5.34 | 5.46 | 3.84 | 5.32 | 5.28 | 3.82 |
| Caprolactam content (wt. %) | 0.07 | 0.08 | 0.09 | 0.08 | 0.08 | 0.08 |
| Oligomer content (wt. %) | 1.12 | 1.13 | 1.21 | 1.04 | 1.99 | 1.94 |
| Tensile strength (Mpa) | 76 | 75 | 74 | 74 | 75 | 76 |
| Tensile breaking elongation (%) | 210 | 216 | 237 | 219 | 209 | 252 |
| Modulus of bending elasticity (GPa) | 2.55 | 2.58 | 2.54 | 2.57 | 2.55 | 2.54 |
| Izod impact value (J/m) | 49 | 50 | 61 | 52 | 50 | 60 |
| Continuous moldability (shots) | 2400 | 2500 | — | 2500 | 1600 | — |
| Continuous film-formability (hrs) | — | — | 68 | — | — | 44 |
| Color tone | white | white | white | white | white | white |

Comparing the data in Examples 17 to 32 with those in Reference Examples 1 to 2, it is known that the quality of the polyamides obtained according to the production method of the invention comprising reduced-pressure solid-phase treatment but not hot water extraction is comparable to that of the polyamides obtained according to the production method comprising conventional hot water extraction. This means that the production method of the invention not comprising hot water extraction is highly efficient and produces high-quality polyamides.

Comparing the data in Examples 17, 23, 25 and 31 with those in Examples 18 to 22, 24, 26 to 30 and 32, it is known that adding the aminocarboxylic acid and/or the dicarboxylic acid/diamine salt to the polymerization system reduces the polymerization time compared wit the polymerization system without the additive component. This means that the additive component is favorable for increasing the production efficiency and for obtaining high-quality polyamides.

Comparing the data in Examples 17 to 24 with those in Examples 25 to 32, it is known that the polymerization temperature that was lower than the melting point of the final polyamide is favorable for reducing the amount of the oligomer. This finally leads to much more reduction of the oligomer content of the final polyamide obtained in the second step.

As opposed to those, the data in Comparative Examples 3 and 4 indicate that, when the polyamides produced in conventional polymerization with a high oligomer content are subjected to the second step of the invention for removing the unreacted caprolactam and the oligomer, the oligomer could not be fully removed from the polyamides, and, as a result, high-quality polyamides could not be obtained in the method of those Comparative Examples 3 and 4.

What is claimed is:

1. A method for producing a polyamide from a caprolactam polymerization, said polyamide having an unreacted caprolactam content of from 0 to 0.5% by weight and an oligomer content of from 0 to 1.25% by weight and having a relative viscosity in a 0.01 g/ml solution of sulfuric acid at 25° C. of from 2.2 to 8.0, which comprises (a) polymerizing a staring material comprising caprolactam, under atmospheric pressure to thereby prepare a polymerization product having an unreacted caprolactam content of not more than 25% by weight and an oligomer content falling between 0 and 1.8% by weight, and (b) heating the polymerization product at a temperature T satisfying the following formula (1), and under reduced pressure, to thereby remove unreacted caprolactam and the oligomer from it:

$$\text{Glass transition point of polyamide} < T < \text{melting point of polyamide} = 150° \text{ C.} \quad (1)$$

said glass transition point and melting of the polyamide being measured by differential scanning calorimetry (DSC) using a sample of said polyamide prepared by rapidly cooling a molten sample at a heating rate of 20° C./min., the glass transition point being determined as the inflection point in the specific heat profile of the polyamide, and the melting point being determined as the peak top temperature of the endothermic peak based on the crystal fusion of said polyamide.

2. The method polyamide production as claimed in claim 1, wherein in step (a), the polymerization temperature is not higher than the melting point of the polyamide being produced, and wherein said step is continued for a period of at least 70% of the polymerization time.

3. The method for polyamide production as claimed in claim 1, wherein the highest polymerization temperature in said step (a) is not higher than the melting point of the polyamide being produced.

4. The method for polyamide production as claimed in claim 1, wherein, in step (a), a salt is used of a dicarboxylic acid/diamine, as a catalyst, in an amount of at most 10 mol % of all the staring compounds.

5. The method for polyamide production as claimed in claim 4, wherein said salt of a dicarboxylic acid/diamine is derived from an aliphatic an/or aromatic dicarboxylic acid and an aliphatic diamine.

6. The method for polyamide production as claimed in claim 4, wherein said dicarboxylic acid that constitutes the salt of a dicarboxylic acid/diamine is adipic acid, and/or said diamine that constitutes the salt of a dicarboxylic acid/diamine is hexamethylenediamine.

7. The method for polyamide production as claimed in claim 4, wherein said salt of a dicarboxylic acid/diamine is of adipic acid and hexamethylenediamine.

8. The method for polyamide production as claimed in any one of claims 1 to 7, wherein said heat treatment in second step (b) is conducted in melt-phase at a temperature not lower than the melting point of the polyamide being produced, under reduced pressure with stirring.

9. The method for polyamide production as claimed in claim 1, wherein said heat treatment in said second step is conducted in solid-phase at a temperature lower than the melting point of the polyamide being produced, and under reduced pressure with stirring.

10. Polyamides obtained according to the production method of any one of claims 1 to 7.

11. Moldings produced by molding the polyamides obtained according to the production method of any one of claims 1 to 7.

* * * * *

UNITED STATES PATENT AND TRADEMARK OFFICE
CERTIFICATE OF CORRECTION

PATENT NO. : 6,169,161 B1
DATED : January 2, 2001
INVENTOR(S) : Tachibana et al

It is certified that error appears in the above-identified patent and that said Letters Patent is hereby corrected as shown below:

Column 13, table 3,
Example 14, at the row beginning with "AH salt (mol %)" please change "-" to -- 1 --.

Signed and Sealed this

Twenty-fifth Day of September, 2001

Attest:

NICHOLAS P. GODICI
Attesting Officer   Acting Director of the United States Patent and Trademark Office